United States Patent [19]

Masuda

[11] Patent Number: 5,680,238
[45] Date of Patent: Oct. 21, 1997

[54] HYBRID SCM OPTICAL TRANSMISSION APPARATUS

[75] Inventor: Shigefumi Masuda, Kawasaki, Japan

[73] Assignee: Fujitsu Limited, Kanagawa, Japan

[21] Appl. No.: 552,484

[22] Filed: Nov. 9, 1995

[30] Foreign Application Priority Data

Jan. 31, 1995 [JP] Japan ................... 7-013328

[51] Int. Cl.$^6$ .................................... H04J 14/02
[52] U.S. Cl. .................. 359/132; 359/125; 359/181; 359/187
[58] Field of Search ....................... 359/124, 125, 359/127, 132, 133, 181, 187

[56] References Cited

U.S. PATENT DOCUMENTS

| | | | |
|---|---|---|---|
| 4,722,081 | 1/1988 | Fujito et al. | 359/132 |
| 4,893,300 | 1/1990 | Carlin et al. | 359/132 |
| 5,134,509 | 7/1992 | Olshansky et al. | 359/132 |
| 5,351,148 | 9/1994 | Maeda et al. | 359/133 |

*Primary Examiner*—Kinfe-Michael Negash
*Attorney, Agent, or Firm*—Helfgott & Karas, P.C.

[57] ABSTRACT

In a hybrid SCM optical transmission apparatus, and particularly in a hybrid SCM optical transmission apparatus which performs transmission by modulating laser light by a hybrid signal formed by frequency multiplexing an analog-modulated signal with a digitally modulated signal to form a hybrid AM-QAM signal, for the purpose of both effective utilization of transmission bandwidth and reduction of clipping deterioration, a signal limiting section which applies limiting to the analog-modulated signal is provided, frequency-division multiplexing being done of analog-modulated signal output from this signal limiting section and a digitally modulated signal. In place of this signal limiting section, a signal limiting section which applies limiting to the hybrid signal, or a delay circuit which delays the hybrid signal by a prescribed amount of time and a clipping compensation section which generates a clipping compensation signal which inhibits the clipping of laser light output by means of a predicted clipping strength which is detected from the hybrid signal during the delay period are used. These are appropriately feedback controlled, in accordance with monitoring of the laser light output.

17 Claims, 12 Drawing Sheets

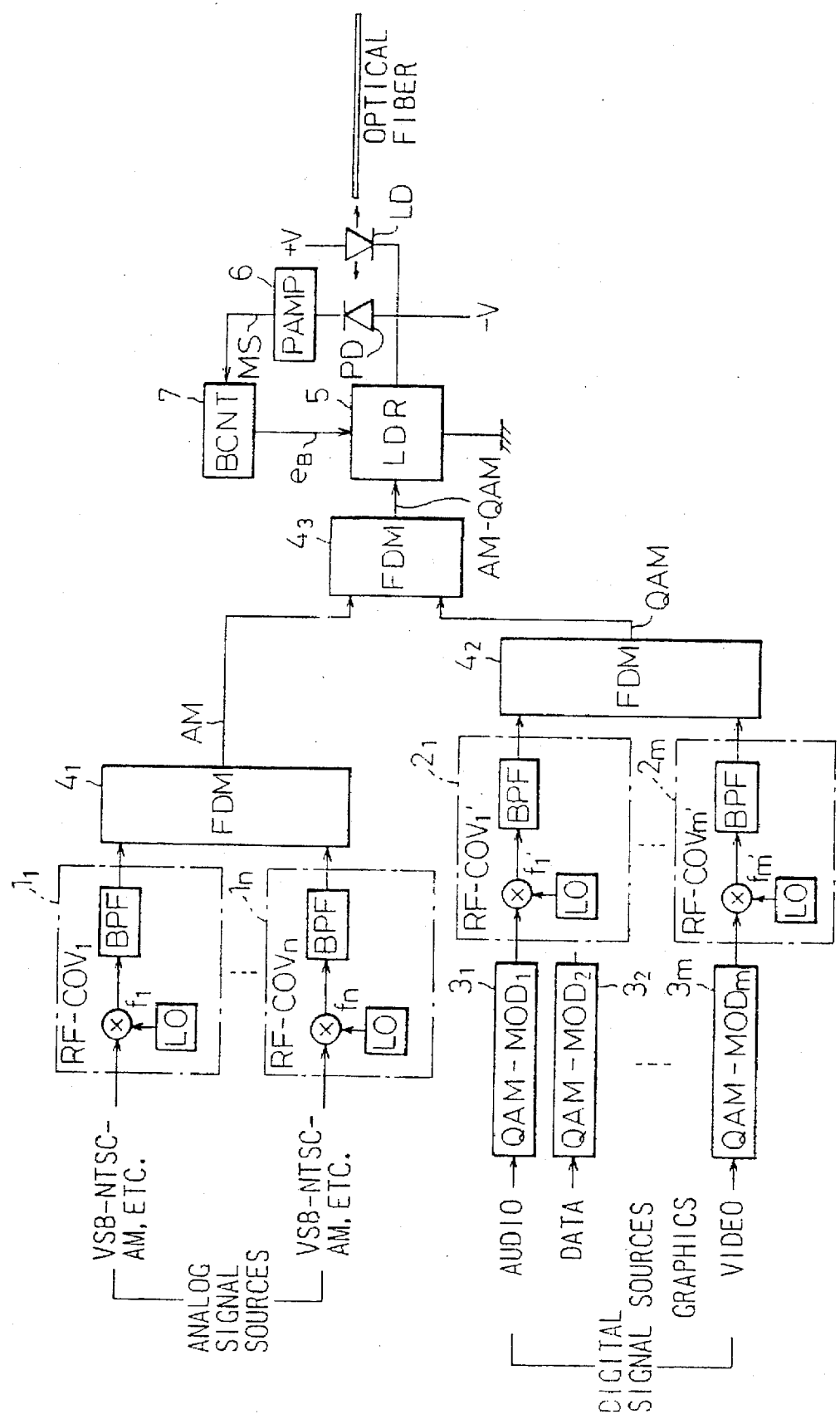

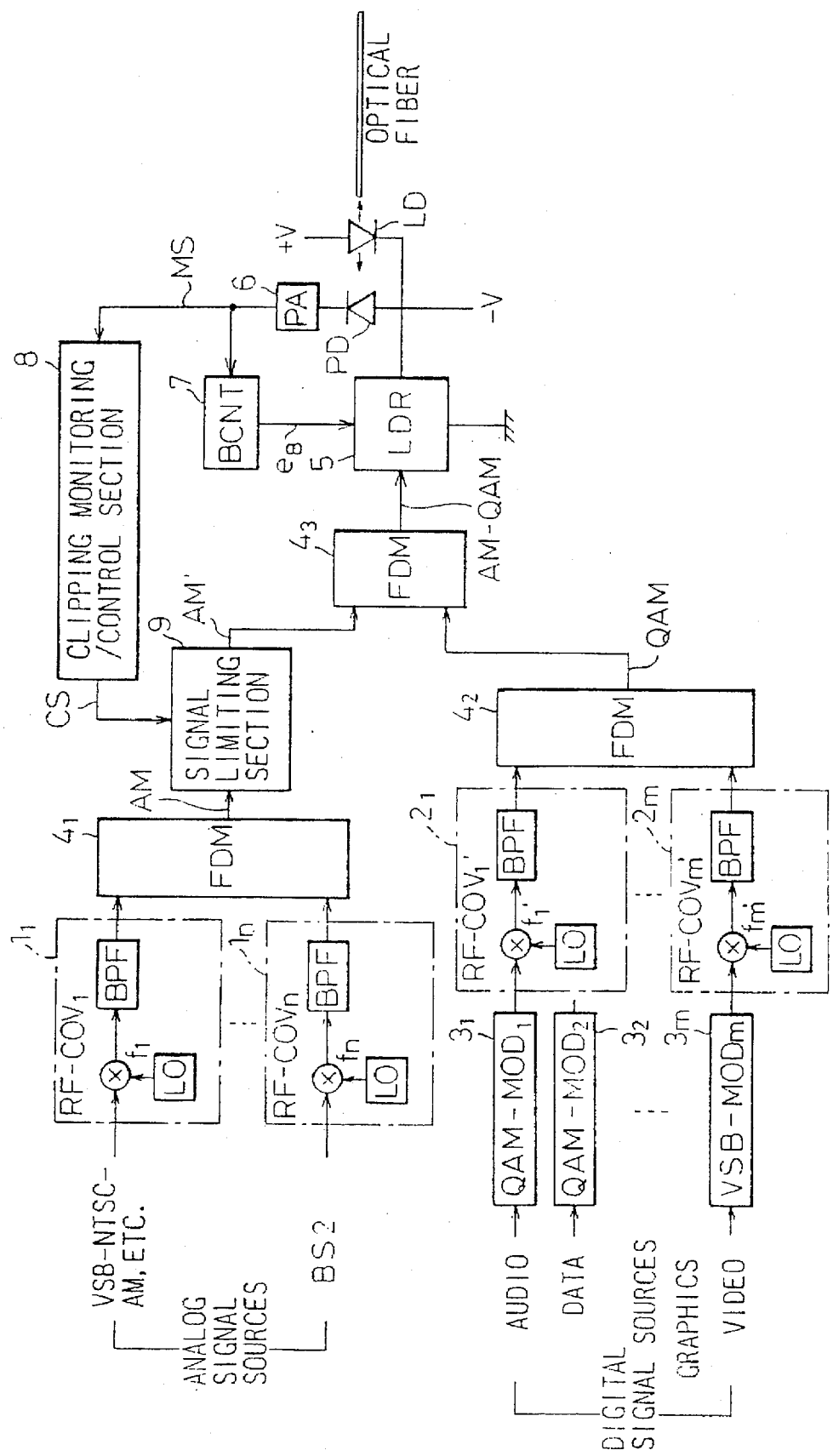

CHANNEL PLACEMENT

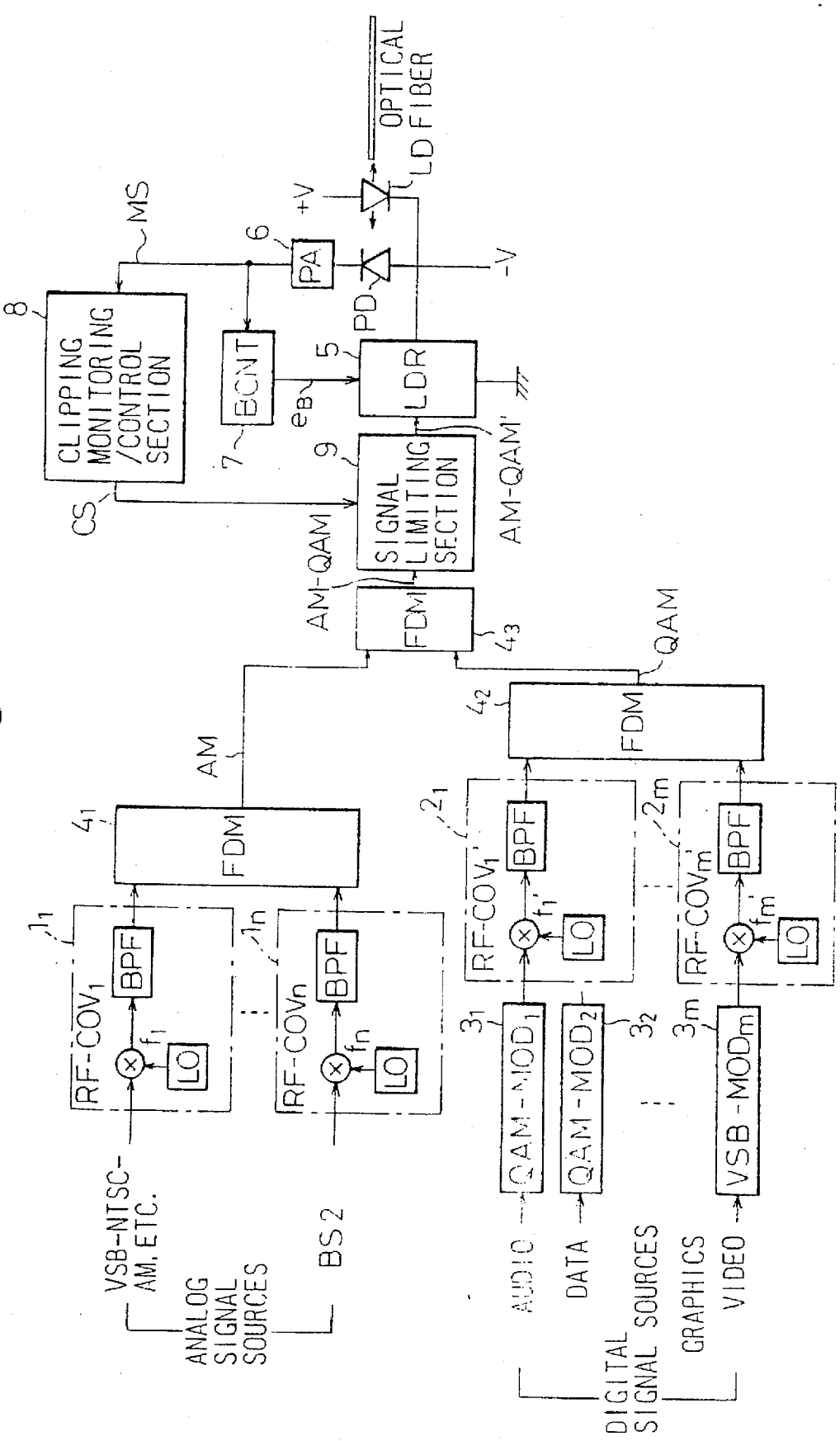

CHANNEL PLACEMENT

HYBRID SCM OPTICAL TRANSMISSION APPARATUS

BACKGROUND OF THE INVENTION

1. Field of the Invention

The present invention relates to a hybrid SCM (subcarrier multiplexing) optical transmission apparatus, and more particularly it relates to a hybrid SCM optical transmission apparatus which transmits by modulating laser light by means of a hybrid signal formed by frequency multiplexing an analog modulation signal and a digital modulation signal.

In recent years, studies have been actively pursued with regard to subcarrier multiplexing (SCM) optical transmission for use in the next generation of wideband CATV networks in which frequency multiplexing is done of existing analog signals (VSB-NTSC-AM, and the like) for TV service, and multi-value digital carrier signals (16,64, 256QAM, 8, 16-VSB, and the like) which are used in new bi-directional communications services such as video-on-demand.

2. Description of the Related Art

In a hybrid SCM optical transmission apparatus of the past, individual analog modulation signals such as VSB-NTSC-AM are upconverted by station-emitted signals having different frequencies, these being output via corresponding bandpass filters, and these outputs being frequency multiplexed to output an analog-modulated multiplexed AM signal. Digital signals for audio, data, graphic, video, and the like, are modulated as, for example, 16QAM signals, each signal being upconverted by station-emitted signals having different frequencies, and output via the corresponding bandpass filters, these outputs being frequency multiplexed to output a digitally modulated multiplexed QAM signal. The above-noted analog-modulated multiplexed AM signal and digitally modulated multiplexed QAM signal are then frequency multiplexed to form a hybrid multiplexed AM-QAM signal output.

However, in the above-noted type of hybrid SCM optical transmission, it is necessary to transmit the analog AM signal, which is required to have a high CNR (carrier-to-noise ratio) with a high optical modulation index, and as a result, the dynamic range of the multiplexed signal output stage can be exceeded, so that clipping occurs, this causing the problem of the coding error rate (BER) of the digital signal QAM increasing, because of clipping distortion in the form of the cutting off of part of the output waveform.

In the past, a means of arranging the frequency placement of the AM and QAM signals was proposed for the purpose of avoiding a deterioration of the BER (Kanazawa, et al "An investigation of clipping in AM/16QAM signal optical SCM transmission and of a method of reducing same," IECE Journal OCS 93-96, pages 17 to 22 (1994-3)), a specific example of this being described below.

For example, it is proposed that a 16QAM signal be located in a high frequency region that is sufficiently removed from the AM signal. However, this results in a wide guardband GB between the AM signal and the QAM signal, which means the utilization efficiency of the transmission band is poor. Furthermore, there is a considerable amount of impulse noise caused by actual clipping distortion in the high frequency region in which the 16QAM signal exists, so that this does not provide a true solution to the problem.

Additionally, there is the method of locating the AM signals at a broad spacing, and interleaving the 16QAM signals between them. However, in this case as well, because of the wide spacing between each of the AM signals, the utilization efficiency of the transmission band is poor. Furthermore, there is a considerable amount of impulse noise caused by actual clipping distortion at the intermediate frequencies of the 16QAM signals, so that this does not provide a true solution to the problem either.

In addition, there has been a proposal of placing a guardband GB of several channels on the high side of the AM signals, and placing the 16QAM signals starting at that point (Maeda, et al "Development of 150-channel AM/16QAM hybrid optical transmission system," IECE OCS 93–97, pages 23 to 31 (1994-3)). However, this proposal is nothing more than a practical compromise in terms of BER deterioration due to clipping distortion, selection of AM signal modulation index, strengthening the error correction coding, and the like.

SUMMARY OF THE INVENTION

An object of the present invention is to provide a hybrid SCM optical transmission apparatus which not only makes efficient use of the transmission band but also reduces the clipping distortion due to the analog-modulated signals.

According to the present invention, a hybrid SCM optical transmission apparatus in which analog-modulated signals and digitally modulated signals are frequency multiplexed to form a hybrid signal which modulates laser light, this apparatus having a signal limiting section which applies limiting to an analog-modulated signal, an analog-modulated signal output from the above-noted signal limiting section and a digitally modulated signal being frequency multiplexed.

The above-noted signal limiting section comprises a limiter circuit which limits the gain of the analog signal, limits the operating range of the analog modulation signal, or clips the level of an analog modulation signal which exceeds a threshold value, and a filter circuit which eliminates a clipping distortion component of the output of the limiter circuit.

The above-noted hybrid SCM optical transmission apparatus also has a clipping monitoring/control section which detects the clipping condition of the laser light based on a monitor signal of the laser output, and which uses this detection to generate a control signal for the purpose of inhibiting the clipping condition, the control signal of the clipping monitoring/control section controlling the amount of limiting of the above-noted limiting section.

The above-noted clipping monitoring/control section detects the clipping condition of the laser light by the dropping of the signal power of the monitor signal below a threshold level, by the rise of the noise level of the monitor signal over a prescribed frequency band, and by the increase of the code error rate after demodulation of the digitally modulated signal on a specific channel of the monitor signal.

According to the present invention, a hybrid SCM optical transmission apparatus is provided, which performs transmission by modulating laser light by a hybrid signal formed by frequency multiplexing an analog-modulated signal with a digitally modulated signal, and in which limiting is applied to this hybrid signal.

The above-noted hybrid SCM optical transmission apparatus also has a clipping monitoring/control section which detects the clipping condition of the laser light based on a monitor signal of the laser output, and which uses this detection to generate a control signal for the purpose of inhibiting the clipping condition, the control signal of the clipping monitoring/control section controlling the amount of limiting of the above-noted limiting section.

In addition, according to the present invention, a hybrid SCM optical transmission apparatus is provided, which performs transmission by modulating laser light by a hybrid signal formed by frequency multiplexing an analog-modulated signal with a digitally modulated signal, this apparatus comprising a delay circuit which delays the hybrid signal by a prescribed amount of time, and a clipping compensation section which inhibits the clipping of the laser output by means of the predicted clipping strength which is detected during the delay time period of the hybrid signal.

The above-noted hybrid SCM optical transmission apparatus additionally comprises a clipping monitoring/control section which generates a control signal for the purpose of inhibiting the clipping condition by detecting the clipping condition of the laser light, based on a monitor signal of the laser output.

BRIEF DESCRIPTION OF THE DRAWINGS

The present invention will be more clearly understood from the description as set forth below, with reference being made to the accompanying drawings, in which:

FIG. 1 is a block diagram of a related hybrid SCM optical transmission apparatus;

FIG. 4A is a block diagram of the first embodiment of a hybrid SCM optical transmission apparatus according to the present invention;

FIG. 9A is a block diagram of the second embodiment of a hybrid SCM optical transmission apparatus according to the present invention;

DESCRIPTION OF THE PREFERRED EMBODIMENTS

Figure 2A:
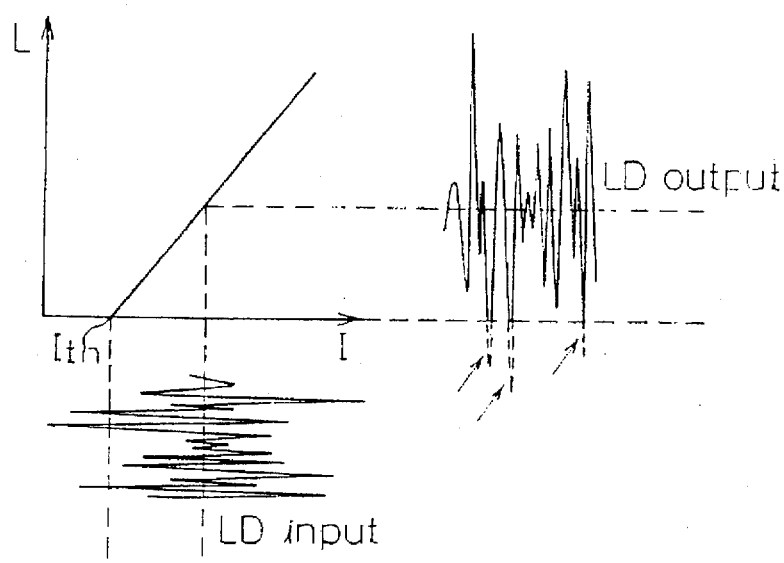
FIG. 2A is a drawing which illustrates problem (1) in the hybrid SCM optical transmission apparatus of FIG. 1.

Before describing the present invention, technology related to the present invention will be described.

FIG. 1 is a block diagram of a hybrid SCM optical transmission apparatus in the prior art, in which the reference numerals $1_1$ to $1_n$ and $2_1$ to $2_m$ denote RF frequency conversion sections (RF-COV), $3_1$ to $3_m$ denote multivalue QAM modulators (QAM-MOD), $4_1$ to $4_s$ denote frequency division multiplexers for the purpose of hybridization (FDM), 5 is a laser driver circuit (LDR), LD is a laser diode, PD is a photodiode such as a PIN diode, 6 is a preamplifier (PAMP), and 7 is a device control section (BCNT).

The RF frequency conversion sections $RF\text{-}COV_1$ to $RF\text{-}COV_n$ perform upconversion of the existing TV analog modulated signals, VSB-NTSC-AM and the like, by means of station-emitted signals $f_1$ to $f_n$, which have different frequencies, these then being output via corresponding bandpass filters (BPF). $FDM4_1$ frequency division multiplexes the various outputs of the $RF\text{-}COV_1$ to $RF\text{-}COV_n$ $1_1$ to $1_n$ to output an analog-modulated multiplexed AM signal.

$QAM\text{-}MOD_1$ to $QAM\text{-}MOD_m$ $3_1$ to $3_m$ modulate digital signals such as audio, data, graphics, and video to 16QAM signals. $RF\text{-}COV_1'$ to $RF\text{-}COV_m'$ $2_1$ to $2_m$ upconvert the various outputs of $QAM\text{-}MOD_1$ to $QAM\text{-}MOD_m$ $3_1$ to $3_m$ by means of station-emitted signals $f_1'$ to $f_m'$, these then being output via corresponding bandpass filters. The $FDM4_2$ frequency division multiplexes the various outputs of the $RF\text{-}COV_1'$ to $RF\text{-}COV_m'$ $2_1$ to $2_m$ to output an digitally modulated multiplexed QAM signal.

The $FDM4_3$ frequency division multiplexes the analog-modulated AM signal and the digitally modulated QAM signal to output a hybrid multiplexed AM-QAM signal.

LDR5 drives a laser diode in accordance with the AM-QAM signal, so that an SCM modulated laser light is transmitted via an optical fiber. At the same time, part of the light from the laser diode is received by a photodiode, and converted to the monitor signal MS by the preamplifier 6. The via control section 7 integrates the monitor signal MS to detect the average laser output power, and performs temperature compensation of the laser diode threshold current $I_{th}$.

Figure 2B:
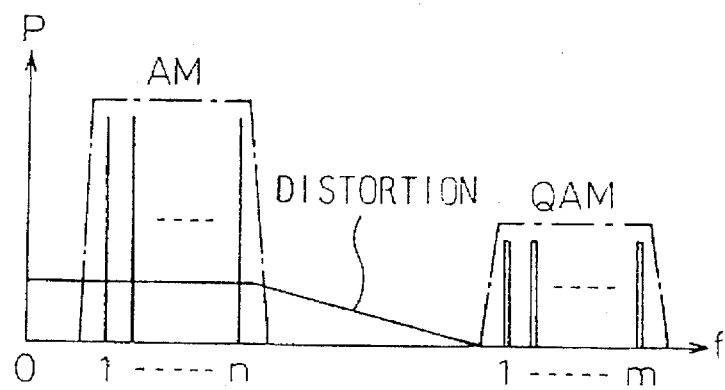
FIG. 2B is a drawing which illustrates problem (2) in the hybrid SCM optical transmission apparatus of FIG. 1.
Figure 2C:
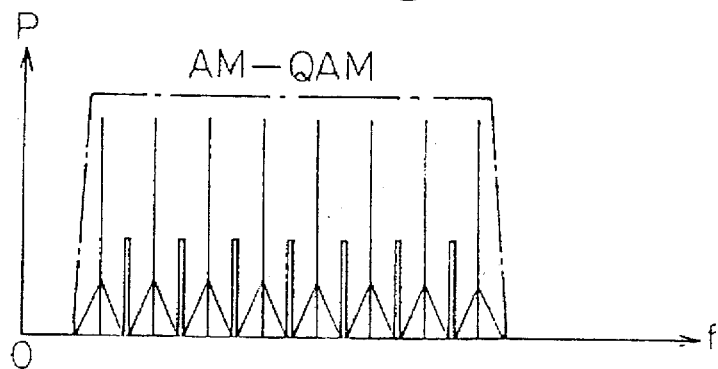
FIG. 2C is a drawing which illustrates problem (3) in the hybrid SCM optical transmission apparatus of FIG. 1.

FIGS. 2A through 2C are provided for the purpose of describing the problems associated with the above-noted technology.

In a hybrid SCM optical transmission apparatus such as described above, it is necessary to transmit the analog AM signal, which is required to have a high CNR (carrier-to-noise ratio) with a high optical modulation index. As shown in FIG. 2A, there are times at which the laser diode drive current momentarily exceeds its threshold current $I_{th}$, at which point the parts of the optical signal waveform output from the laser diode which fall below the threshold value are cut off (clipped). This causes the problem of the coding error rate (BER) of the digital signal QAM deteriorating greatly, because of this clipping distortion.

In the past, there have been proposals for avoiding the deterioration of the BER by means of considering the frequency placement of the AM and QAM signals.

FIG. 2B shows the 16QAM signal placed in a high frequency region which is sufficiently removed from the AM signal. However, this results in a wide guardband GB between the AM signal and the QAM signal, which means the utilization efficiency of the transmission band is poor. Furthermore, there is a considerable amount of impulse noise caused by actual clipping distortion in the high frequency region in which the 16QAM signal exists, so that this does not provide a true solution to the problem.

FIG. 2C shows the arrangement in which the 16QAM signal is interleaved between each of the AM signals, between which a wide spacing has been provided. However, in this case as well, because of the wide spacing between each of the AM signals, the utilization efficiency of the transmission band is poor. Furthermore, there is a considerable amount of impulse noise caused by actual clipping distortion at the intermediate frequencies of the 16QAM signals, so that this does not provide a true solution to the problem either.

Furthermore, although not shown in the drawings, a proposal has been made to place a guardband GB of several channels at the high-frequency side of the AM signals, and to place the 16QAM signals starting at that point. However, this proposal is nothing more than a practical compromise in terms of BER deterioration due to clipping distortion, selection of AM signal modulation index, strengthening the error correction coding, and the like.

Figure 3A:
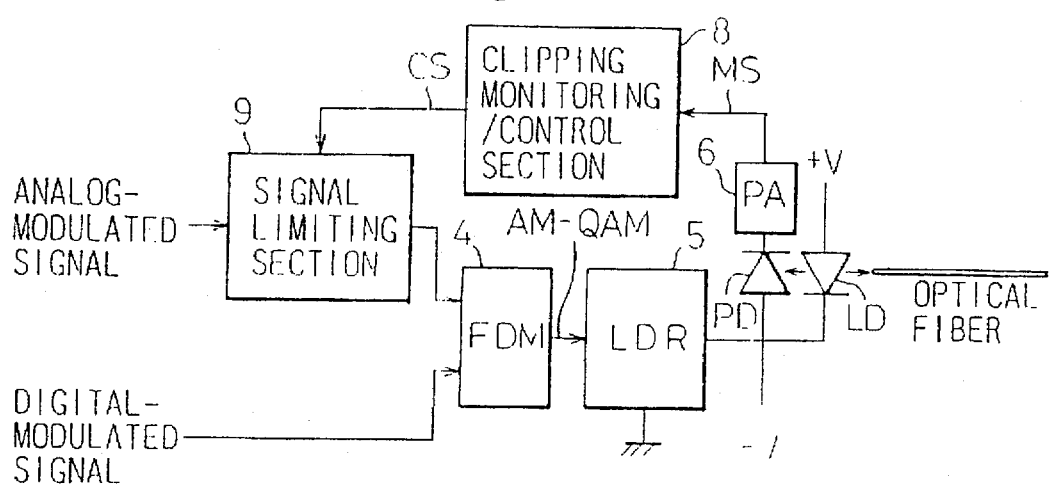
FIG. 3A is the first drawing which illustrates the basic configuration of the present invention.
Figure 3B:
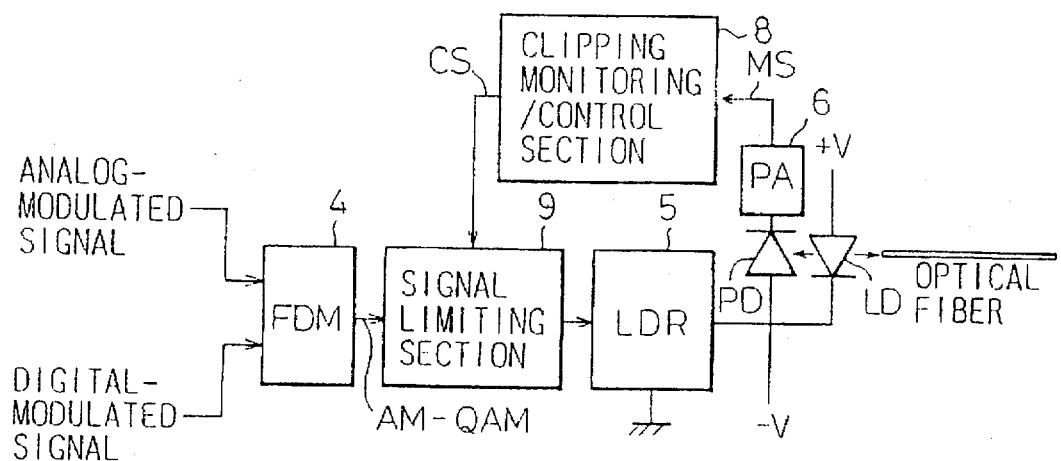
FIG. 3B is the second drawing which illustrates the basic configuration of the present invention.
Figure 3C:
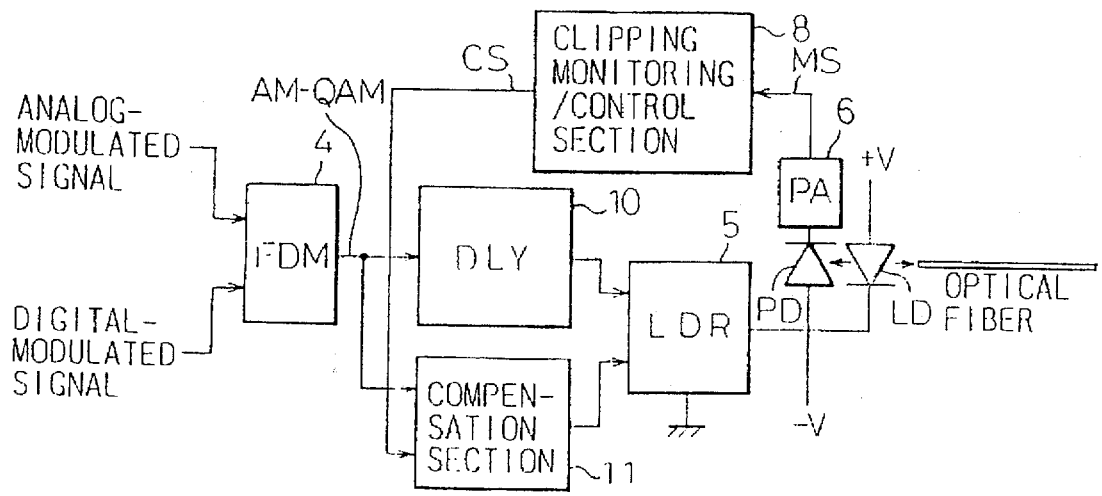
FIG. 3C is the third drawing which illustrates the basic configuration of the present invention.

FIGS. 3A through 3C show the basic configuration of the present invention.

In the configuration shown in FIG. 3A, a hybrid SCM optical transmission apparatus according to the present invention, which transmits by modulating laser light by means of a hybrid signal formed by frequency multiplexing of an analog modulation signal and a digital modulation signal, comprises a signal limiting section which applies limiting to the analog-modulated signal, the analog-modulated signal and digitally modulated signal output from the signal limiting section being frequency division multiplexed.

In the configuration shown in FIG. 3B, a hybrid SCM optical transmission apparatus according to the present invention, which transmits by modulating laser light by means of a hybrid signal formed by frequency multiplexing of an analog modulation signal and a digital modulation signal, comprises a signal limiting section which applies limiting to the hybrid signal.

Further, in the configuration shown in FIG. 3, a hybrid SCM optical transmission apparatus according to the present invention, which transmits by modulating laser light by means of a hybrid signal formed by frequency multiplexing of an analog modulation signal and a digital modulation signal, comprises a delay circuit which delays the hybrid signal by a prescribed amount of time, and a clipping compensation section which inhibits the clipping of the laser output by means of the predicted clipping strength which is detected during the delay time period of the hybrid signal.

In FIG. 3A, the signal limiting section 9 applies beforehand to the analog-modulated signal the required limiting. The frequency division multiplexer 4 frequency division multiplexes the analog-modulated signal output of the signal limiting section 9 and the input digitally modulated signal to form a hybrid AM-QAM signal. This hybrid AM-QAM signal drives the laser driver circuit 5, which modulates, for example, a laser diode LD, by SCM modulation, the laser light from this laser diode being optically transmitted.

In accordance with the above-noted present invention, because the required limiting is applied by the signal limiting section 9 to the input analog-modulated signal beforehand, it is possible to effectively prevent the occurrence of clipping of the laser light output. Therefore, it is possible to prevent the deterioration of the BER of the digitally modulated signal. Because clipping is prevented before it occurs, it is possible to achieve a dense SCM transmission band, thereby achieving high utilization efficiency.

With regard to the analog-modulated signal, although there is some degree of limitation applied, there is little influence on the quality of the service provided. Therefore, a hybrid SCM optical transmission apparatus is provided which not only makes efficient use of the transmission band but also reduces the clipping distortion due to the analog-modulated signals.

Preferably, the signal limiting section 9 limits the gain (amplification/attenuation) of the analog-modulated signal. If the gain of the analog-modulated signal is limited, the occurrence of clipping of the laser output is prevented. In this case, although the CNR of the analog-modulated signal deteriorates somewhat, the quality of the digitally modulated signal service is maintained.

Preferably, the signal limiting section 9 limits the operation range (dynamic range) of the analog-modulated signal. For example, if the dynamic range of the analog-modulated signal at one end is close to the laser diode threshold current $I_{th}$, the DC bias on the analog-modulated signal is shifted so as to assure a sufficient dynamic range. Clipping of the laser light output is thus prevented.

More preferably, the signal limiting section 9 comprises a limiter circuit which clips the signal level of the analog-modulated signal which exceeds a prescribed threshold value, and a filter circuit which eliminates clipping distortion components from the output of the limiter circuit.

Because the limiter circuit pre-clips signal levels of the analog-modulated signal which exceed a prescribed threshold value (voltage/current level), the occurrence of clipping of the laser light output is prevented. Additionally, because the filter eliminates beforehand the clipping distortion components from the output of the limiter circuit, the final AM-QAM signal obtained is free of distortion. Therefore, with regard to the analog-modulated signal, in addition to achieving the required CNR, the required BER is achieved for the digitally-modulated signal.

Yet more preferably, a clipping monitoring/control section 8 is provided, which generates a control signal CS for the purpose of inhibiting the clipping condition of the laser light output by detecting this clipping condition, based on a monitor signal MS which is, for example, opto-electrically converted by the preamplifier 6 from part of the light output from the laser, the amount of limiting of the signal limiting section 9 being controlled by the control signal CS of the clipping monitoring/control section 8.

Therefore, clipping deterioration of the analog-modulated signal can be adaptively reduced.

Preferably, the clipping monitoring/control section 8 detects the clipping condition of the laser light by the drop of the signal power of the monitor signal MS below a prescribed threshold value.

As shown in FIG. 2A, when the laser light output is clipped, that portion of the laser light is cut off (becomes dark). Therefore, it is possible to effectively detect this clipping condition by the drop of the signal power of the monitor signal MS.

Preferably, the clipping monitoring/control section 8 detects the clipping condition of the laser light by the rise of the noise power in a prescribed frequency band of the monitor signal MS to above a prescribed threshold value.

As shown in FIG. 2B, when the laser light output is clipped, impulse noise appears over a wide frequency band, due to clipping distortion. Therefore, it is possible to effectively detect this clipping condition by monitoring the noise power over a prescribed frequency band (guardband) of the monitor signal MS.

In addition, preferably the clipping monitoring/control section 8 detects the clipping condition of the laser light by the increase of the BER code error rate derived upon demodulation of the digitally modulated signal on a specified channel of the monitor signal to above a prescribed threshold value.

As described above, when the laser light output is clipped, the BER of the digital signals deteriorates because of the clipping distortion. Therefore, it possible to effectively detect the clipping condition by demodulating the digitally modulated signal and monitoring the deterioration in the BER.

According to the hybrid SCM optical transmission apparatus of the present invention as shown in FIG. 3B, the signal limiting section 9 applies limiting to the hybrid signal formed by frequency division multiplexing of the analog-modulated signal and digitally modulated signal. While a major cause of clipping of the laser light output is the wide amplitude variation in the analog-modulated signal, it is possible for clipping to occur due to the digitally modulated signal as well. According to the present invention, because the final hybrid AM-QAM signal has limiting applied to it beforehand, the occurrence of clipping of the laser light output is prevented.

Preferably, a clipping monitoring/control section is provided in which the clipping condition is detected based on a laser light output monitor signal MS, this clipping monitoring/control section generating a control signal CS for the purpose of inhibiting the clipping condition by controlling the amount of limiting in the signal limiting section 9. Therefore, adaptive suppression of clipping is achieved.

According to the hybrid SCM optical transmission apparatus of the present invention as shown in FIG. 3A, a delay circuit (DLY) 10 delays the input hybrid signal by a prescribed delay time. The clipping compensation section 11 generates a clipping compensation signal (voltage signal/current signal) which inhibits the clipping condition of the laser light output by means of the predicted strength of the hybrid signal during this delay time period. Therefore, even if there is no limiting applied to the input analog-modulated signal or hybrid signal, it is possible to effectively prevent clipping of the laser light output.

Preferably, a clipping monitoring/control section 8 is provided which detects the clipping condition of the laser light based on the monitor signal MS from the light output of the laser, and which generates, by means of this detection, a control signal CS for the purpose of inhibiting the clipping condition, this control signal CS controlling the amount of compensation of the clipping compensation section 11 (for example, the threshold for the purpose of detecting the predicted clipping strength or the gain of the clipping compensation signal). Therefore, adaptive suppression of clipping is achieved.

Embodiments of the present invention noted above will be described below. In the relevant drawings, the same or equivalent elements have been assigned the same reference numerals.

Figure 4B:
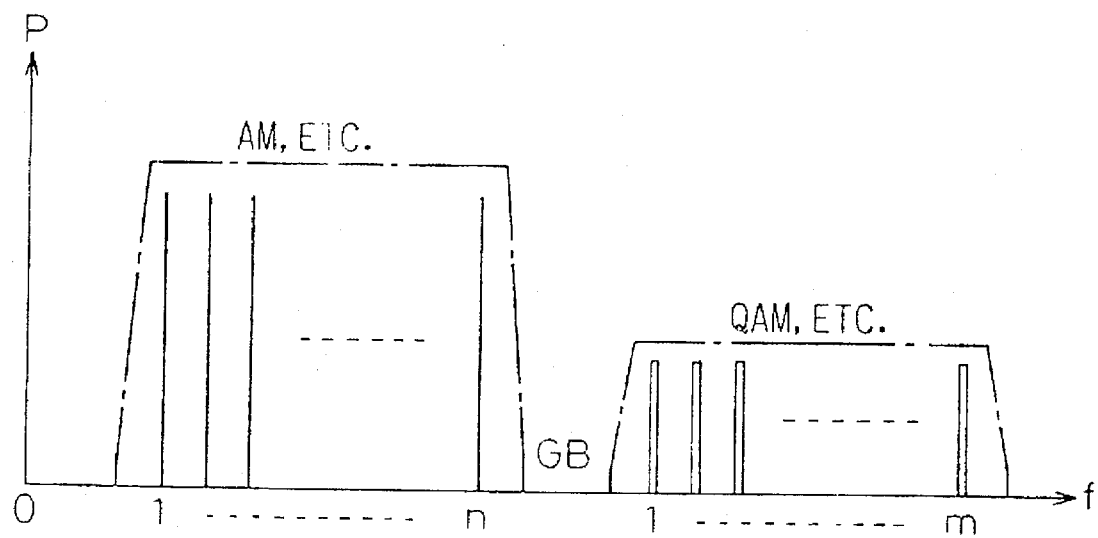
FIG. 4B is a drawing which shows an example of the channel placement in the first embodiment.

FIG. 4A and FIG. 4B show the first embodiment of a hybrid SCM optical transmission apparatus according to the present invention.

FIG. 4A shows the block diagram of the first embodiment of a hybrid SCM optical transmission apparatus according to the present invention, in which reference numerals 8 and 9 denote the clipping monitoring/control section and signal limiting section, respectively. In this example, the analog-modulated signal source includes, in addition to an analog TV signal such as VSB-NTSC-AM (AM modulated signal), a BS2 analog TV signal for satellite (FM modulated signal). The digital signal source is VSB modulated by means of VSB-MOD$_m$ with respect to digital video signals. This VSB modulation is basically the same as QAM modulation, except that the input digital video signal has vestigial sidebands (VSB) extracted and is QAM modulated.

FIG. 4B shows the channel placement in this embodiment. In FIG. 4B, n channels of the analog signals AM or the like are located on the low-frequency region continuously, with no spacing therebetween, and m channels of digital signals QAM or the like are placed in the high-frequency region continuous, with no spacing therebetween, a guardband GB of several channels being provided between the AM signal group and the QAM signal group.

The signal limiting section 9 of FIG. 4A applies limiting to the AM signal gain (amplitude), dynamic level, or waveform, for the purpose of preventing the occurrence of laser diode clipping. Because the AM signals are analog signals, the quality of service will not be influenced much if a small amount of limiting is applied. Because this prevents laser diode clipping before it occurs, the QAM signals are transmitted without errors. As a result, the BER characteristics of the digital signal transmission are improved, and high-quality service is maintained for the transmission system as a whole.

While the settings of the various amounts of limiting in the signal limiting section 9 can be fixed, it is preferable that a clipping monitoring/control section 8 be provided to adaptively prevent laser diode clipping. That is, the clipping monitoring/control section 8 monitors a part of the light output from the laser diode to provide monitoring of the existence or non-existence of clipping. In the case in which the clipping condition is detected, the control signal CS is generated in a direction so as to adaptively control the signal limiting section 9 to avoid this clipping. The various cases are described in detail below.

Figure 5A:
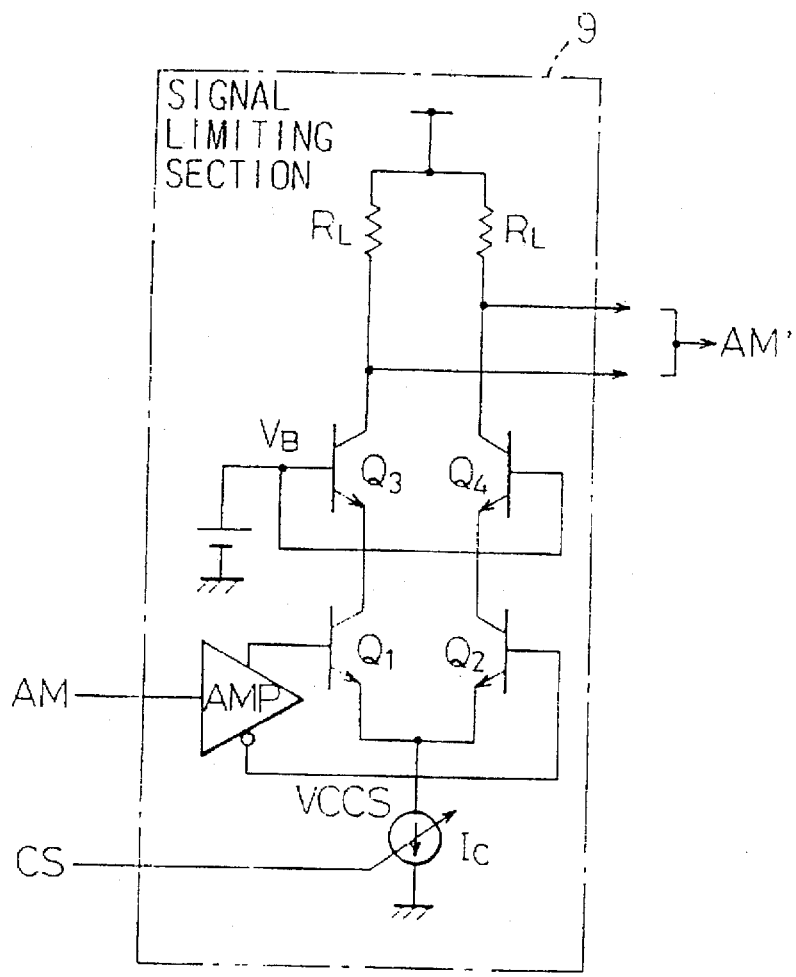
FIG. 5A is a drawing which shows the the signal limiting section of the first embodiment.
Figure 5B:
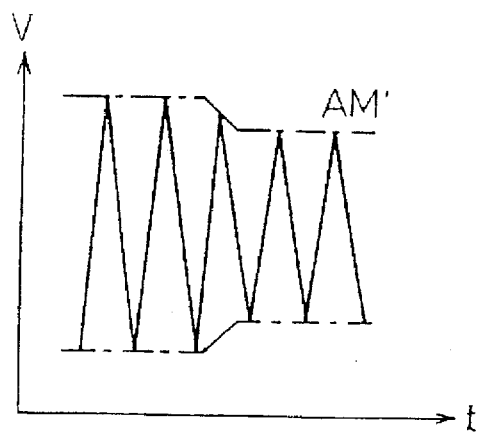
FIG. 5B is a drawing which illustrates the operation of the signal limiting section of the first embodiment.

FIG. 5A and FIG. 5B illustrate the signal limiting section of the first embodiment, in which the gain of the input AM signal is limited. FIG. 5A is the circuit diagram of the signal limiting section 9, and FIG. 5B shows the operation in terms of the AM output waveform thereof.

In FIG. 5A, the transistors $Q_1$ through $Q_4$ are formed as complementary differential pairs, which is preferable from the standpoint of IC implementation. In the case of an unbalanced AM input signal, the amplifier AMP converts this to a balanced set of AM signals, these being input to the bases of the common-emitter amplifiers formed by $Q_1$ and $Q_2$, respectively. The collectors of transistors $Q_1$ and $Q_2$ have connected to them, in cascade, the grounded-base transistors $Q_3$ and $Q_4$. Thus, the impedances of the emitters of transistors $Q_3$ and $Q_4$ as seen from the collectors of transistors $Q_1$ and $Q_2$, respectively, are small. Because of this, the Miller capacitance effect due to the junction capacitance $C_{bc}$ existing between the base and collector of transistors $Q_1$ and $Q_2$ becomes small, so that the amplifier exhibits wideband gain characteristics.

The gain of this amplifier can be varied, for example, by controlling the current value $I_c$ of the variable-current current supply VCCS, this $I_c$ value being controllable by means of the control signal CS. If this control signal CS is set to the desired value beforehand, as shown in FIG. 5B, the output AM' signal amplitude can be controlled to the desired size, therefore enabling the prevention of clipping of the laser diode output.

In the case in which the input AM signal amplitude is large, so that the clipping monitoring/control section 8 detects the occurrence of clipping in the laser diode output, the corresponding CS control signal is fed back so that the gain of the signal limiting section 9 is further reduced, thereby adaptively preventing laser diode output clipping.

Furthermore, in the case in which the input AM signal has sufficient gain, in place of the above-noted amplifier circuit, a variable attenuator (ATT) implemented with passive circuit elements can be used.

Figure 6A:
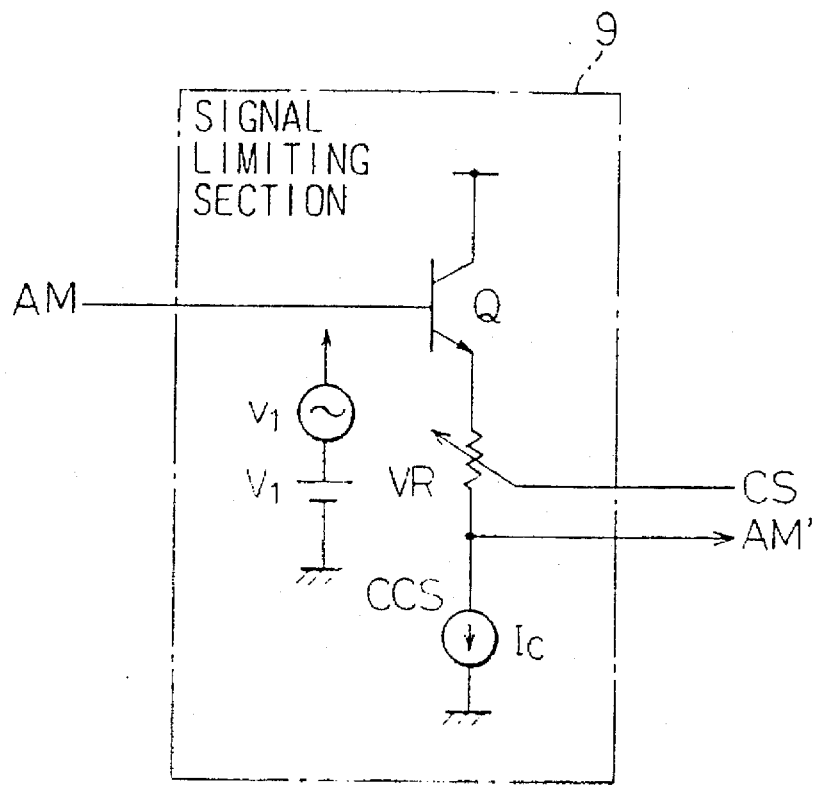
FIG. 6A is a drawing which shows the signal limiting section of the second embodiment.
Figure 6B:
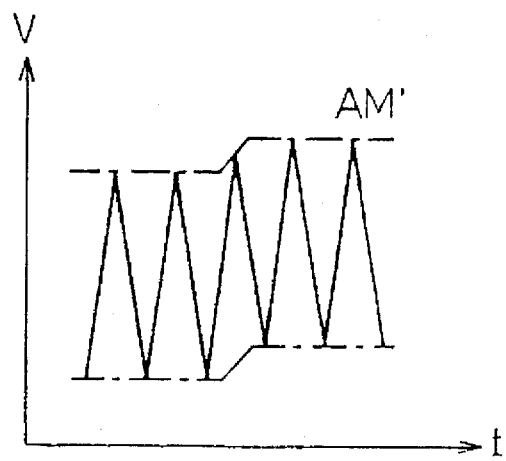
FIG. 6B is a drawing which illustrates the operation of the signal limiting section of the second embodiment.

FIG. 6A and FIG. 6B illustrate the signal limiting section of the second embodiment, in which the case is such that the signal level (dynamic range) of the input AM signal is shifted. FIG. 6A shows the circuit diagram of the signal limiting section 9, and FIG. 6B shows the operation in terms of the AM' output waveform thereof.

In FIG. 6A, in general, the input AM signal level is the sum of the DC signal component $V_i$ and the small-signal component $v_i$. Transistor Q forms an emitter follower circuit, to which, via the variable emitter resistance VR, a constant-current source CCS is connected in cascade. Therefore, if the value of the variable resistor VR is VR, the small-signal component $v_i$ of the input AM signal varies about the DC signal component $V_i$, the small-signal component in the output AM' signal being level-shifted by approximately $\{V_i-(I_c \times VR)\}$ therefrom.

This resistance value VR is varied by means of the control signal CS, and by setting this control signal CS to the desired value beforehand, it is possible, as shown in FIG. 6B, to set the operating level (bias value) of the output AM' signal as desired. Additionally, by feeding back the control signal CS from the clipping monitoring/control section 8, it is possible to adaptively prevent laser diode clipping.

Figure 7A:
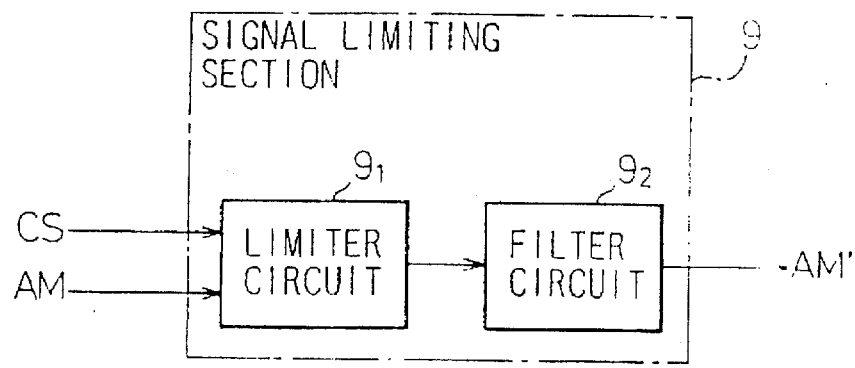
FIG. 7A is the the signal limiting section of the third embodiment.
Figure 7B:
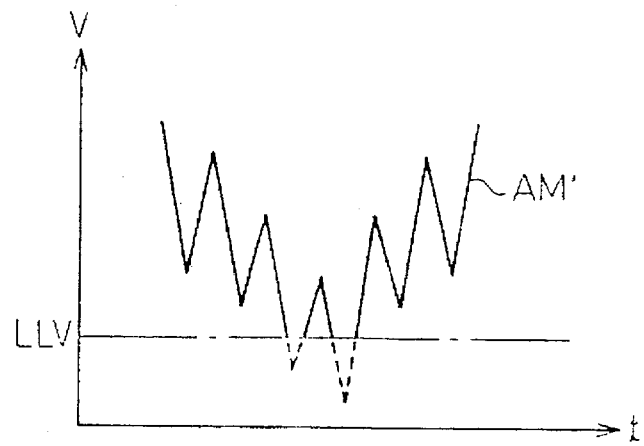
FIG. 7B is the first drawing which illustrates the operation of the signal limiting section of the third embodiment.
Figure 7C:
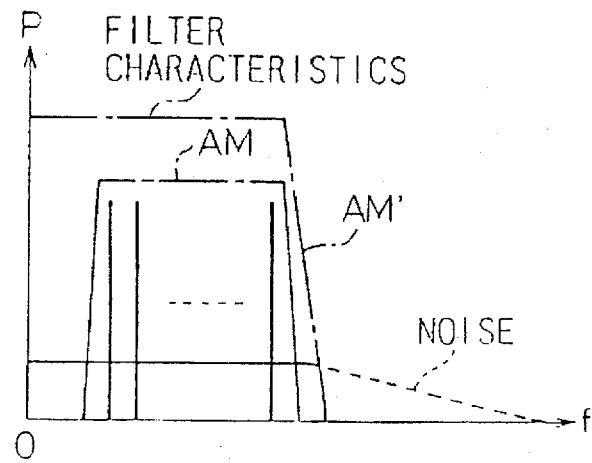
FIG. 7C is the second drawing which illustrates the operation of the signal limiting section of the third embodiment.

FIGS. 7A through 7C illustrate the signal limiting section of the third embodiment, in which a signal waveform which exceeds a prescribed threshold value for the input AM signal is clipped. FIG. 7A is the circuit diagram of the signal limiting section 9, FIG. 7B is the operation of the output waveform AM' therefrom, and FIG. 7C shows the frequency spectrum of the output signal AM'.

In FIG. 7A, the reference numeral $9_1$ denotes a limiter circuit which uses a diode or the like, and $9_2$ is a lowpass filter for the purpose of satisfying the Nyquist criteria with respect to the frequency bandwidth of the AM signal.

In FIG. 7B, when the input AM signal goes below a prescribed limit level LLV so as to cause laser diode clipping, that part of the signal is clipped to LLV.

In FIG. 7C, distortion occurs, because of the above-noted clipping, in the output signal from the limiter $9_1$, the dotted line in this drawing indicating impulse noise which occurs up to a high frequency region. The lowpass filter $9_2$ eliminates this noise component, thereby performing waveshaping of the output AM' signal waveform. Therefore, this noise component caused by clipping does not influence the QAM signal group which is subsequently frequency division multiplexed. Furthermore, although the AM' signal in this case has the same kind of distortion as in the case in which laser diode clipping occurs, because this is an analog signal, there is little problem with this in practice.

In this case as well, if the limit level LLV is made variable in response to the control signal CS from the clipping monitoring/control section 8, it is possible to achieve adaptive avoidance of laser diode clipping.

Figure 8A:
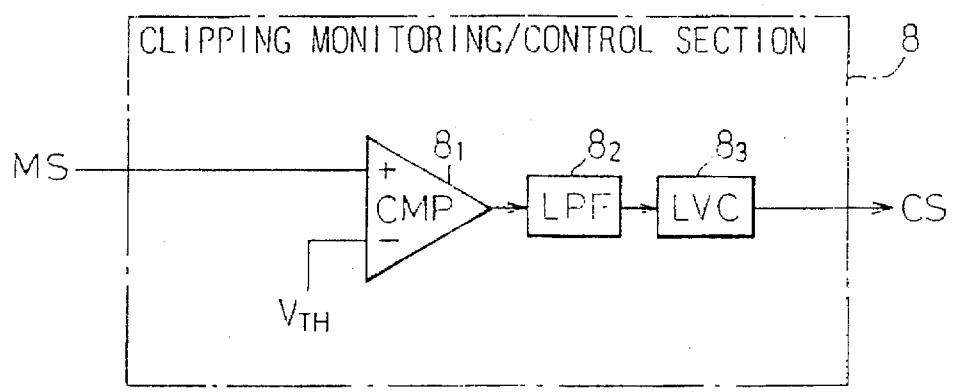
FIG. 8A is a drawing which shows the clipping monitoring/control section of the first embodiment.
Figure 8B:
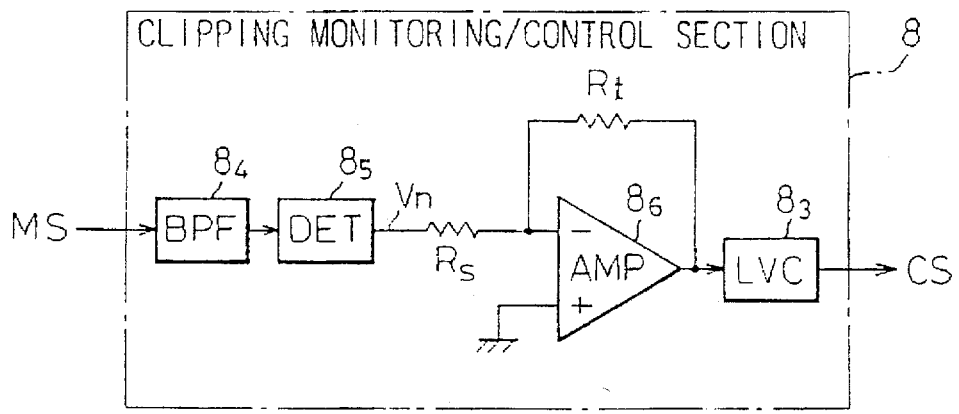
FIG. 8B is a drawing which shows the clipping monitoring/control section of the second embodiment.
Figure 8C:
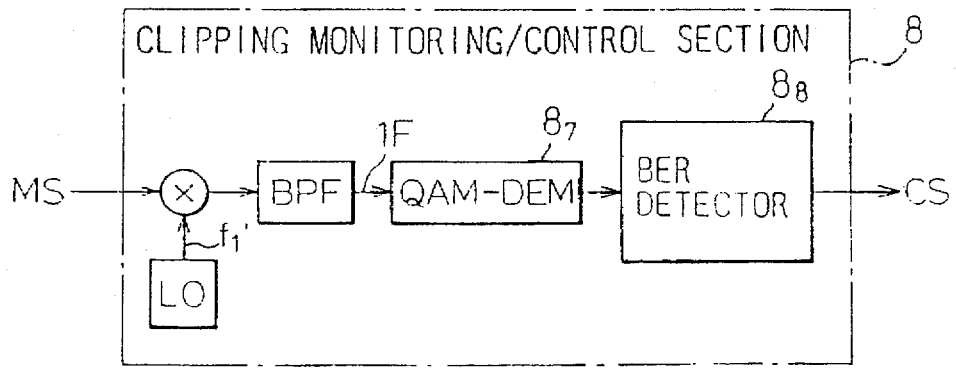
FIG. 8C is a drawing which shows the clipping monitoring/control section of the third embodiment.

FIGS. 8A through 8C illustrate the clipping monitoring/control section of the embodiments.

FIG. 8A is a block diagram of the clipping monitoring/control section of the first embodiment, in which the occurrence of clipping in the laser diode (for example the occurrence of an off period in the laser light) is monitored directly. In this drawing, the reference numeral $8_1$ denotes a comparator (CMP), $8_2$ is a lowpass filter (LPF), and $8_3$ is a level comparator (LVC).

When laser diode clipping occurs, the monitor signal MS signal level falls below a prescribed threshold value $V_{TH}$. When the comparator $8_2$ detects this condition, it generates a pulse having a width which is responsive to the clipping width, and the lowpass filter $8_2$ integrates this using an appropriate time constant. Then, the level comparator $8_3$ converts the output of the lowpass filter $8_2$ to a signal in a direction so as to inhibit the occurrence of clipping, this being output as the control signal CS.

FIG. 8B is a block diagram of the clipping monitoring/control section of the second embodiment, in which the noise level in the guardband GB is monitored. In this drawing, the reference numeral $8_3$ denotes a level converter, $8_4$ is a guardband GB bandpass filter (BPF), $8_5$ is a noise component detector circuit (DET), and $8_6$ is an amplifier (AMP).

When clipping occurs at the laser diode, a noise component is generated in the guardband GB shown in FIG. 4B. The noise component is extracted from the monitor signal MS by means of the bandpass filter $8_4$, and detected by the detector $8_5$. In addition, it is amplified by the amplifier $8_6$, and converted to the control signal CS of the required level by the level converter $8_3$.

FIG. 8C is a block diagram of the clipping monitoring/control section of the third embodiment, in which the BER of a specified digital QAM signal is monitored. In this drawing, $8_7$ is a QAM demodulator (QAM-DEM), and $8_8$ is a BER detection section. When clipping occurs at the laser diode, as shown in FIG. 2B, the influence of the clipping distortion extends to a high-frequency region into which the QAM signal is multiplexed. Because of this, a mixer and a bandpass filter are used to down-convert a specified channel QAM signal to the IF frequency. The specified channel in this case can be a data channel used only for this purpose, or can also be any one of the actually used channels in which the influence of clipping distortion is prominent.

The QAM demodulator $8_7$ demodulates a data signal from the QAM signal of the specified channel. Normally, this type of data signal uses a prescribed type of error detection (correction) code, so that if the determined BER is greater than a prescribed amount, it can be taken that laser diode clipping has occurred, and the control signal CS can be generated so as to inhibit such clipping.

Figure 9B:
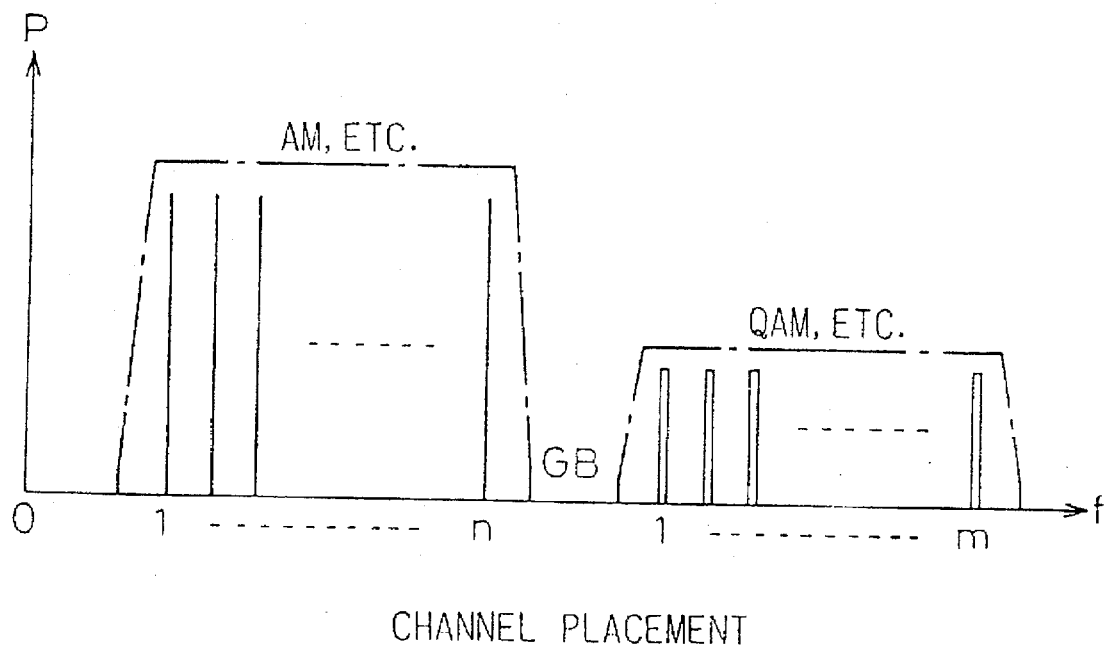
FIG. 9B is a drawing which shows the channel placement in the second embodiment of the present invention.

FIGS. 9A and 9B show the second embodiment of a hybrid SCM optical transmission apparatus according to the present invention.

FIG. 9A shows the block diagram of the second embodiment of the hybrid SCM optical transmission apparatus, and FIG. 9B shows an example of the channel placement thereof. The difference in FIG. 9A with respect to the above-noted first embodiment of the SCM optical transmission apparatus is that the signal limiting section 9 is provided at the output side of the frequency-division multiplexer $4_3$.

Therefore, in this second embodiment, the hybrid AM-QAM signal which is formed by the frequency-division multiplexing of the analog-modulated AM signal and the digitally modulated QAM signal is limited beforehand by the signal limiting section 9, so that laser diode clipping caused by not only the AM signal, but also by the QAM signal is prevented.

In this case, because the signal limiting section 9 can be directly linked to the laser driver circuit 5, it is possible not only to apply limiting to the voltage level of the hybrid AM-QAM signal, but also to apply limiting to the laser diode drive current responsive to the hybrid AM-QAM signal.

Figure 10:
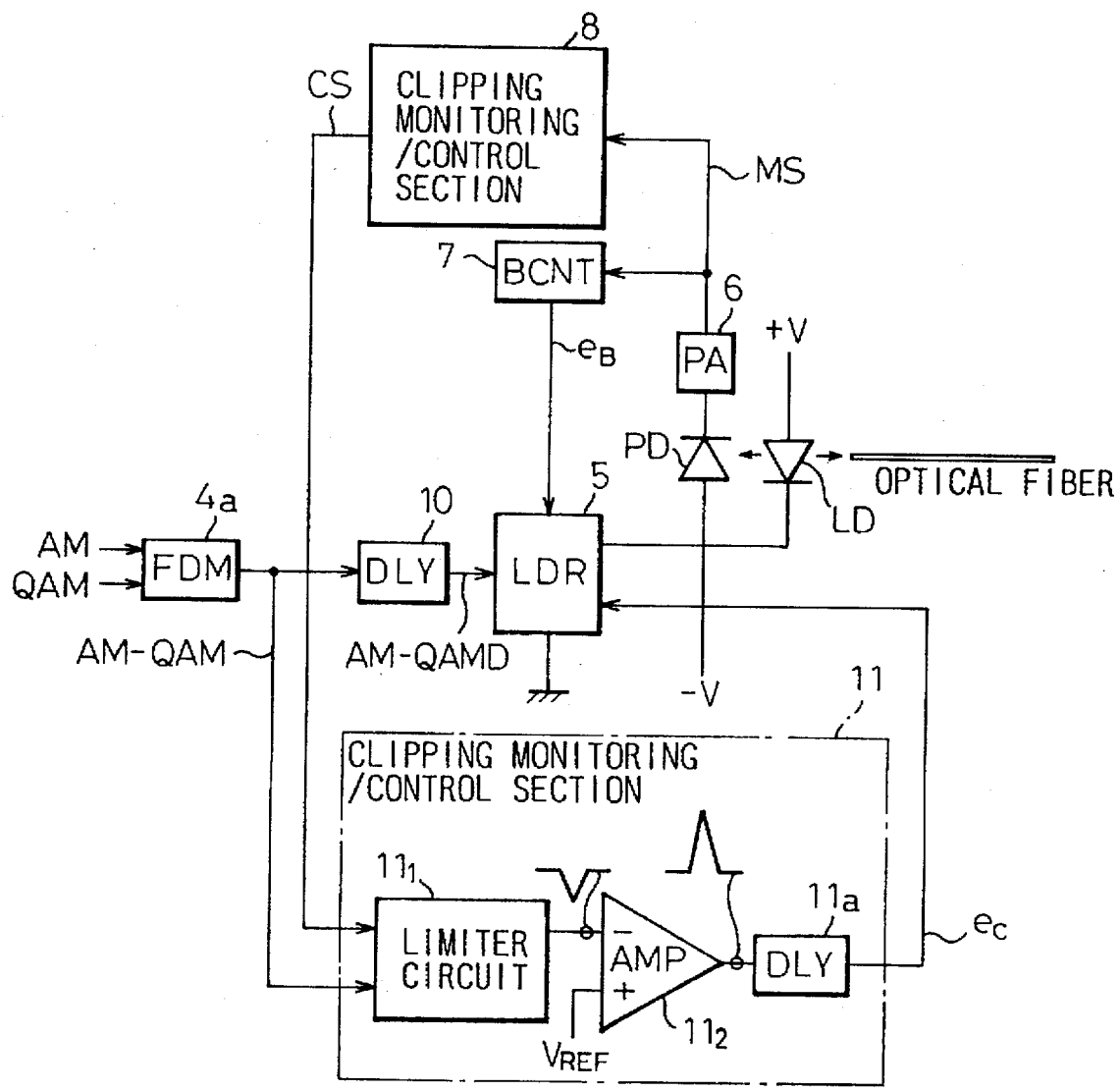
FIG. 10 is a block diagram of the third embodiment of a hybrid SCM optical transmission apparatus according to the present invention.

FIG. 10 is a block diagram of the third embodiment of a hybrid SCM optical transmission apparatus according to the present invention.

In FIG. 10, the reference numeral 10 denotes a delay circuit (DLY), 11 is a clipping compensation section, $11_1$ is a limiter circuit, $11_2$ is an amplifier (AMP), and $11_3$ is a delay circuit (DLY). After the hybrid AM-QAM signal is delayed a prescribed amount of time by the delay circuit 10, it is input to the to the laser driver circuit 5. At the clipping compensation section 11, during this delay time, the limiter circuit 111 detects the signal component of the hybrid AM-QAM signal which exceeds a prescribed threshold value (predicted clipping strength signal), and the amplifier $11_2$ inverts and amplifies this detected predicted clipping strength signal. In addition, the delay circuit $11_3$ delays the output of the amplifier $11_2$ by an amount so as to establish synchronization with the output of the above-noted delay circuit 10, thereby generating the clipping compensation signal $e_c$.

This clipping compensation signal $e_c$ is applied so as to cancel out the clipping strength signal included in the output signal of the delay circuit 10, so that the occurrence of laser diode clipping is prevented. This clipping compensation signal $e_c$ is applied also so as increase the bias current (for example, the threshold current $I_{th}$) of the laser diode in this period, thereby preventing laser diode clipping.

If laser diode clipping still occurs, this is detected at the clipping monitoring/control section 8, and the fed back control signal CS adaptively changes the clamping level of the limiter circuit $11_1$. The gain of the amplifier $11_2$ is changed as appropriate.

Although in the above-noted embodiments were divided into the examples of applying various types of limiting to the AM signal, it will be understood that it is also possible to apply two or more types of limiting simultaneously.

It will also be understood that it is possible to extract the monitor light of the laser diode LD by using an optical coupler or a beam splitter.

While a number of preferred embodiments of the present invention have been presented above, it is obvious that a variety of changes can be made in the configuration of the present invention and combinations thereof, as long as they fall within the scope of the concept of the present invention. As described in detail above, by virtue of the above-described constitution, a hybrid SCM optical transmission apparatus according to the present invention, not only is effectively usable in such applications as CATV trunk line transmission, in which both analog signals and digital signals are transmitted via an optical fiber, but also greatly reduces clipping deterioration related to analog-modulated signal.

What is claimed is:

1. A hybrid SCM optical transmission apparatus which transmits by modulating laser light by means of a hybrid signal formed by frequency multiplexing of an analog-modulated signal and a digitally modulated signal, said hybrid SCM optical transmission apparatus comprising:

a signal limiting section which applies a prescribed limiting to an analog-modulated signal for the purpose of preventing deterioration of said analog-modulated signal due to clipping thereof;

a frequency-division multiplexing section which frequency-division multiplexes said analog-modulated signal from said signal limiting section and a digitally modulated signal; and a laser drive section which modulates light from a laser by a hybrid electrical signal formed by frequency multiplexing from said frequency-multiplexed signal, wherein said signal limiting section comprises a limiter circuit which clips the signal level of said analog-modulated signal which exceeds a prescribed threshold value, and a filter circuit which eliminates clipping distortion components of the output of said limiter circuit.

2. A hybrid SCM optical transmission apparatus which transmits by modulating laser light by means of a hybrid signal formed by frequency multiplexing of an analog-modulated signal and a digitally modulated signal, said hybrid SCM optical transmission apparatus comprising:

a signal limiting section which applies a prescribed limiting to an analog-modulated signal for the purpose of preventing deterioration of said analog-modulated signal due to clipping thereof;

a frequency-division multiplexing section which frequency-division multiplexes said analog-modulated signal from said signal limiting section and a digitally modulated signal; and a laser drive section which modulates light from a laser by a hybrid electrical signal formed by frequency multiplexing from said frequency-multiplexed signal, a clipping monitoring/control section which generates a control signal for the purpose of inhibiting the clipping condition by detecting the clipping condition of the laser light based on a monitor signal of the laser light output in accordance with the laser drive section, whereby said control signal of said clipping monitoring/control section appropriately controls the amount of prescribed limiting in said signal limiting section.

3. A hybrid SCM optical transmission apparatus according to claim 2, wherein said clipping monitoring/control section detects the clipping condition of the laser light by the fall in the signal power of said monitor signal below, a prescribed threshold value.

4. A hybrid SCM optical transmission apparatus according to claim 2, wherein said clipping monitoring/control section detects the clipping condition of the laser light by the exceeding, by the noise power in a prescribed frequency band of said monitor signal, of a prescribed threshold.

5. A hybrid SCM optical transmission apparatus according to claim 2, wherein said clipping monitoring/control section detects the clipping condition of the laser light by the exceeding, by the code error rate obtained by demodulating a digitally modulated signal on a specified channel of said monitor signal, of a specified threshold.

6. A hybrid SCM optical transmission apparatus which transmits by modulating laser light by means of a hybrid signal formed by frequency multiplexing of an analog-modulated signal and a digitally modulated signal, said hybrid SCM optical transmission apparatus comprising:

a frequency-division multiplexing section which frequency-division multiplexes said analog-modulated signal and a digitally modulated signal;

a signal limiting section which applies a prescribed limiting to a frequency-division multiplexed hybrid signal from a frequency-division multiplexing section for the purpose of preventing deterioration of said analog-modulated signal due to clipping thereof, said signal limiting section limiting the gain of said hybrid signal as said prescribed limiting;

a laser drive section which modulates light to be output from a laser by an electrical signal from said signal limiting section; and a clipping monitoring/control section which generates a control signal for the purpose of inhibiting the clipping condition by detecting the clipping condition of the laser light based on a monitor signal of the laser light output in accordance with the laser drive section, whereby said control signal of said clipping monitoring/control section appropriately controls the amount of prescribed limiting in said signal limiting section.

7. A hybrid SCM optical transmission apparatus which transmits by modulating laser light by means of a hybrid signal formed by frequency multiplexing of an analog-modulated signal and a digitally modulated signal, said hybrid SCM optical transmission apparatus comprising:

a frequency-division multiplexing section which frequency-division multiplexes said analog-modulated signal and a digitally modulated signal;

a signal limiting section which applies a prescribed limiting to a frequency-division multiplexed hybrid signal from a frequency-division multiplexing section for the purpose of preventing deterioration of said analog-modulated signal due to clipping thereof, said signal limiting section limiting the operating range of said hybrid signal as said prescribed limiting;

a laser drive section which modulates light to be output from a laser by an electrical signal from said signal limiting section; and a clipping monitoring/control section which generates a control signal for the purpose of inhibiting the clipping condition by detecting the clipping condition of the laser light based on a monitor signal of the laser light output in accordance with the laser drive section, whereby said control signal of said clipping monitoring/control section appropriately controls the amount of prescribed limiting in said signal limiting section.

8. A hybrid SCM optical transmission apparatus which transmits by modulating laser light by means of a hybrid signal formed by frequency multiplexing of an analog-modulated signal and a digitally modulated signal, said hybrid SCM optical transmission apparatus comprising:

a frequency-division multiplexing section which frequency-division multiplexes said analog-modulated signal and a digitally modulated signal;

a signal limiting section which applies a prescribed limiting to a frequency-division multiplexed hybrid signal from a frequency-division multiplexing section for the purpose of preventing deterioration of said analog-modulated signal due to clipping thereof;

a laser drive section which modulates light to be output from a laser by an electrical signal from said signal limiting section; and a clipping monitoring/control section which generates a control signal for the purpose of inhibiting the clipping condition by detecting the clipping condition of the laser light based on a monitor signal of the laser light output in accordance with said laser drive section, whereby said control signal of said clipping monitoring/control section appropriately controls a prescribed amount of limiting in said signal limiting section.

9. A hybrid SCM optical transmission apparatus according to claim 8, wherein said clipping monitoring/control section detects the clipping condition of the laser light by the fall, in the signal power of said monitor signal, below a prescribed threshold value.

10. A hybrid SCM optical transmission apparatus according to claim 8, wherein said clipping monitoring/control section detects the clipping condition of the laser light by the exceeding, by the noise power in a prescribed frequency band, of said monitor signal of a prescribed threshold.

11. A hybrid SCM optical transmission apparatus according to claim 8, wherein said clipping monitoring/control section detects the clipping condition of the laser light by the exceeding, by the code error rate obtained by demodulating a digitally modulated signal on a specified channel of said monitor signal, of a specified threshold.

12. A hybrid SCM optical transmission apparatus which transmits by modulating laser light by means of a hybrid signal formed by frequency multiplexing of an analog-modulated signal and a digital modulation signal, said hybrid SCM optical transmission apparatus comprising:

a frequency-division multiplexing section which frequency-division multiplexes said analog-modulated signal and a digitally modulated signal;

a delay circuit which delays said frequency-division multiplexed hybrid signal from said frequency-division multiplexing section by a prescribed amount of time;

a clipping compensation section which generates a clipping compensation signal which inhibits clipping of the laser light output by means of a predicted clipping strength which is detected from the hybrid signal; and a laser drive section which modulates light to be output from a laser by means of an electrical signal from which clipping has been prevented, which is formed from the delayed hybrid signal from said delay circuit and said clipping compensation signal which is in synchronization therewith.

13. A hybrid SCM optical transmission apparatus according to claim 12, further comprising a clipping monitoring/control section which generates a control signal for the purpose of inhibiting the clipping condition by detecting the clipping condition of the laser light based on a monitor signal of the laser light output in accordance with said laser drive section, whereby said control signal of said clipping monitoring/control section appropriately controls said clipping compensation signal in said clipping compensation section.

14. A hybrid SCM optical transmission apparatus according to claim 13, wherein said clipping compensation section detects the clipping condition of the laser light by the fall, in the signal power of said monitor signal, below a prescribed threshold value.

15. A hybrid SCM optical transmission apparatus according to claim 13, wherein said clipping monitoring/control section detects the clipping condition of the laser light by the exceeding, by the noise power in a prescribed frequency band of said monitor signal, of a prescribed threshold.

16. A hybrid SCM optical transmission apparatus which transmits by modulating laser light by means of a hybrid signal formed by frequency multiplexing of an analog-modulated signal and a digitally modulated signal, said hybrid SCM optical transmission apparatus comprising:

a signal limiting section which limits the amplitude of only said analog-modulated signal for the purpose of preventing deterioration of said analog-modulated signal due to clipping thereof;

a frequency-division multiplexing section which frequency-division multiplexes said analog-modulated signal from said signal limiting section and a digitally modulated signal; and a laser drive section which modulates light from a laser by a hybrid electrical signal formed by frequency multiplexing from said frequency-multiplexed signal; and a clipping monitoring/control section which generates a control signal for the purpose of inhibiting the clipping condition by detecting the clipping condition of the laser light based on a monitor signal of the laser light output in accordance with the laser drive section, whereby said control signal of said clipping monitoring/control section appropriately controls the amount of prescribed limiting in said signal limiting section.

17. A hybrid SCM optical transmission apparatus which transmits by modulating laser light by means of a hybrid signal formed by frequency multiplexing of an analog-modulated signal and a digitally modulated signal, said hybrid SCM optical transmission apparatus comprising:

a signal limiting section which shifts a D.C. bias of only said analog-modulated signal for the purpose of preventing deterioration of said analog-modulated signal due to clipping thereof;

a frequency-division multiplexing section which frequency-division multiplexes said analog-modulated signal from said signal limiting section and a digitally modulated signal; and a laser drive section which modulates light from a laser by a hybrid electrical signal formed by frequency multiplexing from said frequency-multiplexed signal; and a clipping monitoring/control section which generates a control signal for the purpose of inhibiting the clipping condition by detecting the clipping condition of the laser light based on a monitor signal of the laser light output in accordance with the laser drive section, whereby said control signal of said clipping monitoring/control section appropriately controls the amount of prescribed limiting in said signal limiting section.

* * * * *